US006895506B1

(12) United States Patent
Abu-Husein

(10) Patent No.: US 6,895,506 B1
(45) Date of Patent: May 17, 2005

(54) SECURE STORAGE AND EXECUTION OF PROCESSOR CONTROL PROGRAMS BY ENCRYPTION AND A PROGRAM LOADER/ DECRYPTION MECHANISM

(76) Inventor: Loay Abu-Husein, 11928 W. Rader Dr., Boise, ID (US) 83713

( * ) Notice: Subject to any disclaimer, the term of this patent is extended or adjusted under 35 U.S.C. 154(b) by 0 days.

(21) Appl. No.: 09/572,716

(22) Filed: May 16, 2000

(51) Int. Cl.[7] ............................................... H04L 9/00
(52) U.S. Cl. ......................... 713/193; 713/1; 713/171; 713/189; 713/190; 713/200; 380/29; 380/30; 705/53
(58) Field of Search ............................ 713/1, 171, 189, 713/190, 193, 200; 380/29, 30; 705/53

(56) References Cited

U.S. PATENT DOCUMENTS

| | | | |
|---|---|---|---|
| 4,278,837 A | | 7/1981 | Best |
| 4,319,079 A | | 3/1982 | Best |
| 4,847,902 A | * | 7/1989 | Hampson .................... 713/190 |
| 5,142,677 A | * | 8/1992 | Ehlig et al. ................. 718/108 |
| 5,224,166 A | * | 6/1993 | Hartman, Jr. ............... 713/190 |
| 5,386,469 A | * | 1/1995 | Yearsley et al. ............ 713/190 |
| 5,535,397 A | * | 7/1996 | Durante et al. ............. 710/267 |
| 5,625,690 A | * | 4/1997 | Michel et al. ................ 705/53 |
| 5,825,878 A | * | 10/1998 | Takahashi et al. .......... 713/190 |
| 5,925,126 A | * | 7/1999 | Hsieh ......................... 713/200 |
| 5,944,821 A | * | 8/1999 | Angelo ....................... 713/200 |
| 5,982,887 A | * | 11/1999 | Hirotani ...................... 705/51 |
| 6,003,117 A | * | 12/1999 | Buer et al. .................. 711/163 |
| 6,075,862 A | * | 6/2000 | Yoshida et al. .............. 380/28 |
| 6,081,895 A | * | 6/2000 | Harrison et al. ............ 713/189 |
| 6,199,181 B1 | * | 3/2001 | Rechef et al. ................ 714/38 |
| 6,223,288 B1 | * | 4/2001 | Byrne ......................... 713/190 |
| 6,385,727 B1 | * | 5/2002 | Cassagnol et al. .......... 713/193 |
| 6,449,720 B1 | * | 9/2002 | Sprague et al. ............. 713/171 |
| 2001/0011353 A1 | * | 8/2001 | Little et al. .................. 713/200 |
| 2001/0018736 A1 | * | 8/2001 | Hashimoto et al. ............ 713/1 |
| 2002/0099946 A1 | * | 7/2002 | Herbert et al. .............. 713/193 |

FOREIGN PATENT DOCUMENTS

| | | | |
|---|---|---|---|
| EP | 0768601 A | 4/1997 | |
| JP | 2000155819 A | * 6/2000 | .......... G06K/19/07 |
| WO | WO 00/70429 A | 11/2000 | |

OTHER PUBLICATIONS

Computer Dictionary, Microsoft Press, Third Edition, 1997, pp. 316–317.*

* cited by examiner

Primary Examiner—Emmanuel L. Moise
Assistant Examiner—Taghi T. Arani

(57) ABSTRACT

A method and a mechanism for securely storing and executing a program in a computer system processing unit, including a storage unit for storing an encrypted version of the program and a loader/decryption mechanism responsive to a request and a decryption key for decrypting the encrypted version of the program, writing the un-encrypted version into a memory for execution, and deleting the un-encrypted version from the memory when execution is completed. The encrypted version is constructed as encrypted code blocks that are decrypted and loaded into the memory only as required, and the encrypted version of the program includes a clear text header identifying the encrypted version as an encrypted program. The processor unit includes a context store for storing the context of a process in which the program is being executed, and a context switching mechanism for performing context switching operations wherein the context switching mechanism is responsive to a context switch of the process in which the program is being executed for storing the clear text header in the context store when the process is suspended in a context switch and returning the clear text header to the memory when the process is resumed.

16 Claims, 2 Drawing Sheets

SECURE STORAGE AND EXECUTION OF PROCESSOR CONTROL PROGRAMS BY ENCRYPTION AND A PROGRAM LOADER/DECRYPTION MECHANISM

FIELD OF THE INVENTION

The present invention relates to a method and apparatus for securely storing and executing control programs, such as third party printer control programs, and in particular to a method and apparatus for securely storing and executing a processor control program by encryption of a processor control byte code program and run-time decryption of an encrypted processor control byte code program using an encryption key and a cryptographic support byte code loader.

BACKGROUND OF THE INVENTION

It is well known and understood that computer systems, whether stand alone desktop units or large networked systems, are comprised of a number and variety of different types of components or units, each of which is designed to fulfill certain purposes or a range of purposes. For example, the primary units in a computer system are general purpose processing units comprised of one or more general purpose processors, memory or non-volatile storage devices that are designed and intended to perform a range of data manipulation tasks, such as document or image processing and editing, data management, and so on. Other components of such systems, however, are primarily designed to perform more specific tasks or a more specific range of tasks, such as communications servers, file servers, printers, and so on. Unlike general purpose processing units, which are intended to perform a range of often disparate tasks and are thus typically program controlled, with their function at any time being controlled by the programs, specific function units have tended to be less programmable. That is, and even though specific function units have typically been implemented with many of the components used in general purpose processing units, such as programmable processors, memories, and so on, as well has the hardware components specific to their intended functions, specific function units have typically not been provided with the "programmable" capabilities of general purpose processing units. That is, the general purpose processing elements of specific function units have normally been controlled by programs residing in the general purpose processing units, such as printer driver programs residing in personal computers, or by programs stored in the specific function units in various forms of permanent, unchangeable memory, such as ROMs (Read Only Memories).

While limiting the flexibility and adaptability of such specific function units, and making upgrades or changes in function more difficult by requiring the replacement of a physical component such as a program ROM with another physical component, this principle has been advantageous in allowing greater control over the distribution of the programs used to control the functions of such units. That is, the programs that control the functions and operations of any device in a computer system may exist in either of two forms, either as hard-wired programs residing, for example, in ROMs, or as transportable programs residing, for example, on hard disks. A fundamental distinction between these two forms is that transportable programs may be readily moved, copied, downloaded, and so on, and are thus readily subject to unauthorized copying or use while hard-wired programs are significantly more difficult to copy or otherwise use for unauthorized purposes. In the methods of the prior art, therefore, the majority of programs that were implemented in transportable form resided in the general purpose processing units, which formed the minority of units in a computer system so that the transportable programs were more subject to effective control. In contrast, the programs controlling the more numerous specific purpose units were "non-transportable", either resided in the specific function units as hard-wired programs and thus being significantly harder to copy or residing in the general purpose processing units and thus being subject to the same controls as other programs in the general purpose processing units.

More recent trends in computer systems, however, including both stand-alone desktop systems or large networked systems, have been to implement specific function devices as fully or extensively programmable devices in the same manner as general purpose processing units, with the additional components necessary to their primary functions, such as communications controllers or print mechanisms. This approach provides a significantly greater degree of adaptability and flexibility to the units, allows the range and complexity of tasks that each can perform to be readily increased or modified, and allows upgrades, modifications and the addition of functions by program loading rather than by replacement of hardware components. This, however, has necessitated in the control programs for such devices and units being implemented in the devices as "transportable" programs resident on hard disk or in other forms of readable and writeable storage. As a result, the control programs for specific function devices are significantly more susceptible to copying or other unauthorized use and are notable more difficult to protect from unauthorized uses. This, in turn, is a matter of concern to both the creators of such control programs and the manufacturers of computer systems that incorporate third party programs.

The present invention provides a solution to these and other related problems of the prior art.

SUMMARY OF THE INVENTION

The present invention is directed to a method and a mechanism for securely storing and executing a program in a computer system processing unit that includes a processor responsive to program code for performing operations, a memory for storing program code to be executed to control operations of the processor unit, a storage unit for storing programs, and a memory manager for managing use of the memory.

According to the present invention, the mechanism for securely storing and executing a program includes the storage unit for storing an encrypted version of the program and a loader/decryption mechanism that is responsive to a request for an operation to be performed by the program and to a decryption key for reading the encrypted version of the program from the storage unit and decrypting the encrypted version of the program according to the decryption key, which is provided to the processor unit from an external source in conjunction with the request for an operation, to recover the un-encrypted version of the program code. The loader/decryption mechanism is responsive to direction of the memory manager for writing the un-encrypted version of the program code into the memory for execution by the processor, wherein the processor is responsive to the writing of the un-encrypted version of the program code into the memory for executing the un-encrypted version of the program code to perform the requested operation, and the memory manager is responsive to execution of the program code for deleting the un-encrypted version of the program code from the memory when execution of the program code is completed.

In a presently preferred embodiment of the invention, the encrypted version of the program is constructed as a plurality of encrypted code blocks, wherein each encrypted code block contains the encrypted program code for performing a function of the program, and the encrypted code blocks are decrypted and loaded into the memory only as required for execution of the requested operation.

In one embodiment of the present invention, the memory manager operates to delete the un-encrypted version of the program code from the memory when execution of the un-encrypted version of the program code is completed by operation of the memory manager in directing the loading of subsequent other program code into the memory. In an alternate embodiment, the memory manager is modified to be responsive to execution of the program code for detecting completion of execution of the un-encrypted version of the program code and performing a specific operation for deleting the executed un-encrypted version of the program code from the memory.

In a further presently preferred embodiment of the invention, the encrypted version of the program includes a clear text header identifying the encrypted version of the program as an encrypted program and the loader/decryption mechanism is responsive to clear the text header, when reading the encrypted version of the program from the storage unit, for detecting that the encrypted version of the program is an encrypted program and decrypting the encrypted version of the program to recover the un-encrypted version of the program code.

In yet another implementation of the present invention, the processor unit includes a context store for storing the context of a process in which the program is being executed, and a context switching mechanism for performing context switching operations wherein the context switching mechanism is responsive to a context switch of the process in which the program is being executed for storing the clear text header in the context store when the process is suspended in a context switch and returning the clear text header to the memory when the process is resumed.

DESCRIPTION OF THE DRAWINGS

The foregoing and other objects, features and advantages of the present invention will be apparent from the following description of the invention and embodiments thereof, as illustrated in the accompanying figures, wherein.

DETAILED DESCRIPTION OF THE INVENTION

Figure 1:
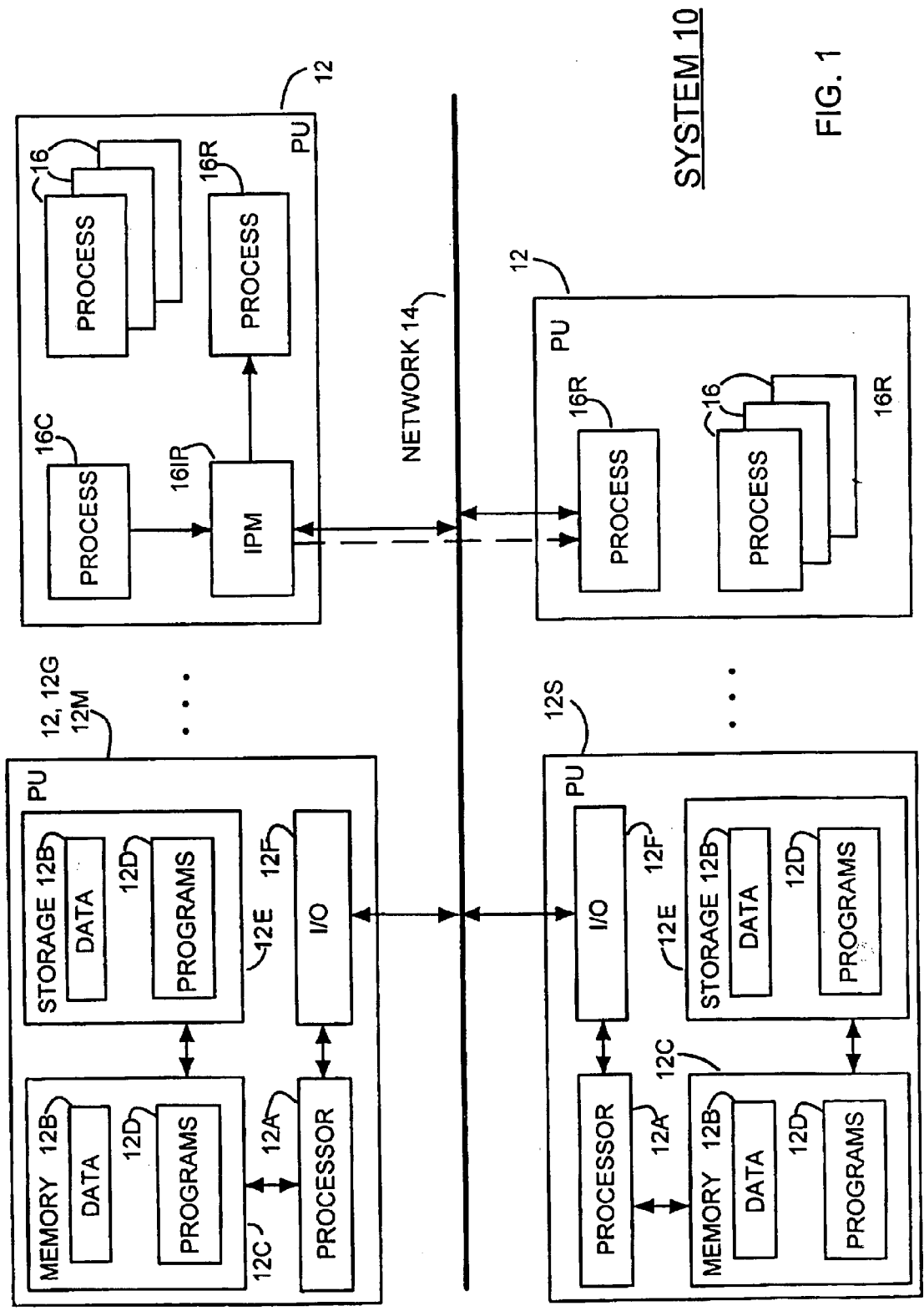
FIG. 1 is a block diagram of a computer system incorporating the present invention; and, FIG. 2 is a block diagram of a computer system incorporating the present invention and illustrating the method and apparatus of the present invention.

Referring to FIG. 1, therein is shown a block diagram illustrating the general structure and operation of a computer system that may incorporate the present invention. As shown in FIG. 1, a typical System 10 in which the present invention may be implemented may include one or more Processor Units (PUs) 12, which will include General Purpose Processor Units (PUs) 12G for performing general purpose data processing and system management functions and one or more Specific Function Processing Units (PUs) 12S for performing a defined set of specific tasks or functions, such as printers, file servers and communications servers. PUs 12 will typically be interconnected through a Network 14 for communication therebetween wherein Network 14 may be comprised, for example, of a system bus, a parallel bus, a universal serial bus, a local area network or a wide area network, depending upon the System 10. In addition, and in a typical larger, networked System 10, at least one PU 12, indicated as a PU 12M, will be designated as and will operate as a system administrative node to supervise and control the overall operation of System 10. As will be described in the following, such a PU 12M may operate to distribute and control the installation and use of programs according to the present invention and may, for example, control and administer the distribution of keys controlling the use of such programs according to the present invention. PUs 12G.

As illustrated in FIG. 1 with respect to a PU 12G and a PU 12S, which for purposes of illustration are representative of PUs 12, each PU 12 will typically include a Processor 12A for performing operations on Data 12B and controlling the operation of the PU 12, a Memory 12C for storing Data 12B and one or more Programs 12D controlling the operations of Processor Unit 12A, and a Read/Write Non-Volatile Storage Unit (Storage) 12E for storing Data 12B and Programs 12D. A PU 12 will also typically include various Input/Output Devices (I/O) 12F, such as network and communications controllers, keyboards, mouse's and displays. A PU 12S may also include various Input/Output Devices (I/O) 12F, such as network and communications controllers, keyboards, mousses and displays, and will include devices necessary to the particular primary functions of the PU12S, such as a printer mechanism, a scanner, a fax mechanism, a disk array, communications controllers, and so on, depending upon the primary functions of the PU 12S.

It will be understood by those of ordinary skill in the relevant arts that, as illustrated in FIG. 1, operations are performed or executed in PUs 12 by means of Processes 16 wherein a Process 16 may be generally defined as a thread of control, that is, a sequence of program controlled operations, passing through one or more Programs 12D controlling the operations of one or more PUs 12. A Process 16 typically performs a single operation or a group or set of related operations, such as file management operations, and, as such, a Process 16, hereafter referred to as a Process 16C, may call or invoke another Process 16 or other Processes 16, hereafter referred as a Process 16R or Processes 16R, to perform operations not included within the operations performed by the Process 16C, and a Process 16R may, in turn, become a calling Process 16C of another Process 16R. For example, a Process 16C executing a document editing program in a PU 12G may call a print manager Process 16R residing in the same PU 12G to assemble and format a document for printing, and the print manager Process 16R may act as Process 16C to call a print driver Process 16R residing in a printer PU 16S to physically print the document.

It will be noted that, as well understood by those of ordinary skill in the relevant arts, each call or request from one Process 16 to another Process 16 will include the information necessary for the called Process 16 to perform the requested operation. This information may include, for example, an identification and specification of the operation to be performed, an identification of how the results of the operation are to be treated, and any data to be operated upon or an identifier of such data. As must also be noted, and as will also be understood, such communications between Processes 16 are typically and generally executed through an Interprocess Communication Mechanism (IPM) 16IP, which may, for example, be comprised of or include "pipes", first-in-first-out queues or memories (FIFOs), messages queues, stack mechanisms, and so on. Interprocess communications through an IPM 16IP may occur within a single PU 12 or between different PUs 12 and, in the case of an interprocess communication between PUs-12, an interprocess communication may also include or utilize, for example, a Network 14 and the mechanisms and processes associated with communications through the Network 14.

In a typical operation, for example, Data 12B generated or stored in a PU 12G by a Process 16C may be communicated to a PU 12S through an IPM 16IP and a Network 14 and stored therein to be operated upon by a Process 16R in the PU 12S executing one or more Programs 12B residing in the PU 12S as called or requested by the Programs 12D executed by the Process 16C. The operation or operations that are performed by the Process 16R or Processes 16R of the PU 12S are, as described, determined by the primary functions for which the PU 12S is designed. If, for example, the PU 12S is a printer, the Data 12B will typically be in the form of a document or image file, the operation requested by the PU 12G will typically be for a print operation, and the Process 16R or Processes 16R in the PU 12S will execute printer control Programs 12D to print the document or image file. It will also be understood that in the PUs 12S of the prior art, as described herein above, Storage 12E would typically be in the form of a read-only, hard-wired storage device, such as a ROM, that is used to permanently store only Programs 12D, and that if Data 12B must be stored in a PU 12S other than temporarily in Memory 12C, a separate storage device, such as a hard disk, must be provided for such longer term data storage.

Figure 2:
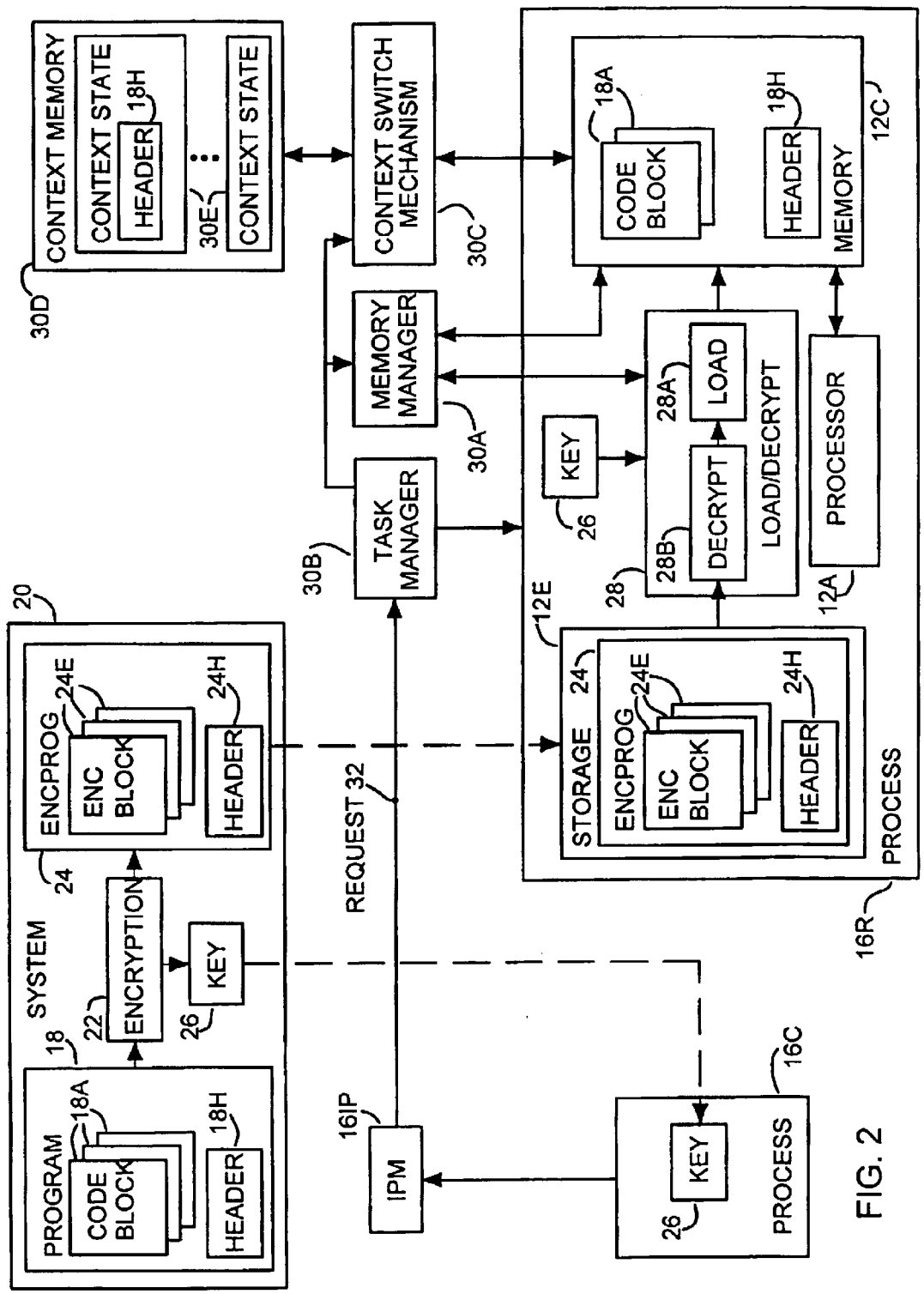

Referring now to FIG. 2, therein is illustrated an exemplary implementation of an embodiment of the method and apparatus of the present invention based upon the System 10 of FIG. 1. As illustrated therein, a Program 18 to be installed in one or more PUs 12 as a resident program to control the operations of the PUs 12 by being executed by one or more Processes 16 therein, in the same manner as a Program 12D as described above, is created according to normal and customary programming practices. The Program 18 may be created on, for example, a System 20 that is separate from the System 10 and is used, for example, by a program developer for program development purposes.

The Program 18 is then encrypted or encoded by a Program Encryption Mechanism (Encryption) 22 that generates as an output a corresponding Encrypted Program (EncProg) 24 and a Key 26 that may be distributed with the EncProg 24 and used to subsequently decrypt EncProg 24. In the presently preferred embodiment Encryption 22 uses a public/private key encryption method, which is well understood by those of ordinary skill in the relevant arts, wherein the private key is securely retained by the creator/distributor of the program and the public key is provided to the user as Key 26 to decrypt and access the encrypted program code. It will be understood, however, that any preferred encryption or encoding program may be used to perform the functions of EncProg 24, depending upon the choices and requirements of the designer. It should also be understood that the term "encryption" as used herein includes both encryption and encoding methods intended to protect a body of information, such as a program, from unauthorized access. It will also be understood that Key 26 may be provided to EncProg 24 from an external source to be used as the key in encrypting or encoding a Program 18, and thereafter provided as the Key 26 to decrypt or decode the EncProg 24. Alternately, the Key 26 may be generated by the EncProg 24 during the encryption process, or may be derived from an input Key 26 in the encryption process.

In the presently preferred embodiment of the invention, a Program 18 is preferably created as a plurality of Program Code Blocks (Code Blocks) 18A wherein each Code Block 18A performs a function or operation of the Program 18. Program 18 is then encrypted so that EncProg 24 is likewise comprised of a plurality of Encrypted Code Blocks (EncBlocks) 24E wherein each EncBlock 24E is the encrypted version of a corresponding Code Block 18A and wherein each EncBlock 24E may be separately and individually decrypted to recover the corresponding original Code Block 18A version of the program code. In addition, in the presently preferred embodiment each EncProg 24 or EncBlock 24E is provided with a clear text Header 24H identifying the file as encrypted and, if necessary in a particular implementation, information to identify and acquire the Key 26 required to decrypt the encrypted program code.

EncProg 24 is then distributed to and installed in a System 10 by any desired and selected conventional method, which are well understood by those of ordinary skill in the relevant arts. For example, the EncProg 24 may be directly loaded from disk into Storage 12E of the target PU 12, or by loading EncProg 24 into Storage 12E of another PU 12 or a PU 12M, either directly from disk or through a network connection, and downloading the EncProg 24 from the PU 12G or PU 12GM into Storage 12E through Network 14.

At the same time or at a later time, the Key 26 associated with the EncProg 24 and necessary to decrypt or decode the EncProg 24 to recover the original version of Program 18 is provided to the System 10. In this regard, and for example, the Key 26 may be stored in a PU 12M and distributed to those PUs 12 that are to have authorization to access and execute the Program 18 under control of a system administrator. In this instance, the Key 26 may be provided to a PU 12 only at the time the PU 12 is to invoke and execute the Program 18, and typically only after the PU 12 has successfully executed an authorization confirmation process. In other implementations, the Key 26 may be distributed from a PU 12M to the authorized PUs 12 at an initial point, to be readily available for use by the PU 12, or the Key 26 may be provided to and stored in one or more PUs 12 directly. It will be well understood by those of ordinary skill in the relevant arts that the method for controlling access to and the distribution of a Key 26 will depend upon the structure and operation of a particular System 10 and the administrative methods chosen to control access to the Key 26 and thus to the Program 18.

As illustrated in FIG. 2, the PU 12 in which the Program 18 is to be executed is provided with a Program Loader/Decryption Mechanism (Load/Decrypt) 28, which may be implemented, for example, as a program controlled Process 16 executed by Processor 12A wherein the program code comprising Load/Decrypt 28 will typically reside in Storage 12E but may, for example, be stored in a hard-wired memory such as a ROM. Load/Decrypt 28 is similar to a conventional loading utility in responding to calls, commands or requests for the execution of a program or a program module or function by operating in conjunction with a Memory Manager 30A to read the corresponding program code from Storage 12E and to write the program code into Memory 12C at locations selected and managed by Memory Manager 30A for execution by Processor 12A. In addition to a Load 28A mechanism, however, Load/Decrypt 28 includes a Decryption 28B mechanism that operates with Load 28A to recognize encrypted program code such as an EncProg 24, for example, by means of clear text Headers 24H in the EncProg 24 or EncBlocks 24E, and, when provided with a corresponding Key 26, to decrypt or decode the EncProg 24 or EncBlocks 24E to recover the original Program 18 version of the program code.

In this regard, and while the original version of Program 18 may be written and encrypted as a single block, as may be the case for small programs and routines, in the presently preferred embodiment Program 18 is, as described, constructed as a plurality of Code Blocks 18A, so that EncProg 24 is similarly comprised of a corresponding plurality of encrypted or encoded EncBlocks 24E. As such, Load 28A and Decrypt 28B will operate to read and decrypt each EncBlock 24E separately and individually, as required to execute the functions and operations of Program 18, and will write each decrypted Code Block 18A into Memory 12C separately and individually as required for execution by Processor 12A. It should also be noted that in the presently preferred embodiment of the invention Load/Decrypt 28 is designed as a general purpose load/decrypt mechanism capable of decrypting and loading a variety of EncProgs 24 if provided with the appropriate Keys 26. In this respect, the primary limitation upon the type of EncProgs 24 that may be decrypted and loaded by Load/Decrypt 28 is determined by the encryption method used to encrypt Programs 18 and the corresponding Keys 26 required to decrypt the resulting EncProgs 24.

Assuming, therefore, that an EncProg 24 is installed and resident in the Storage 12E of a PU 12 that is to be controlled by the EncProg 24 and that the Key 26 is resident in or is otherwise available to a PU 12, a Process 16C executing in that PU 12 or in another PU 12 will generate a request, call or invocation, indicated as Request 32, of an operation to be performed by a Process 16R executing Program 18 and will communicate the Request 32 through an appropriate IPM 16IP. The requested operation may be, for example, an operation on Data 12B resident in the PU 12 or transferred to the PU 12 or any other operation capable of being executed by the PU 12 under control of the Program 18.

The receiving of a Request 32 by the PU 12 in which the functions of Program 18 are to be performed, which may be the same PU 12 in which the Process 16C resides or a different PU 12, will result in the creation of a Process 16R in which Program 18 is to be executed by Task Manager 30B. As will be understood by those of ordinary skill in the relevant arts, and although the structure and operations of a Task Manager 30B may vary significantly from system to system, a Task Manager 30B is a component of the operating system level functions of a system and the general function of a Task Manager 30B is to control and manage the execution of Processes 16 and other operations of a PU 12, such as Memory Manager 30A and a Context Switch Mechanism 30C, discussed below.

The appropriate Key 26 will be provided to Load/Decrypt 28, for example, either directly and as part of the Process 16C invocation of the operation or indirectly from, for example, a PU 12M upon request by the Process 16C. The Key 26 may also be provided to Load/Decrypt 26 by request from the Process 16R upon Load/Decrypt 28 detecting that the request is for an encrypted program. In this respect, it has been described above that EncProg 24 may include a clear text Header 24H identifying EncProg 24 as encrypted, and possibly an identifier of the required Key 26.

Upon receiving the Key 26, Load/Decrypt 28 will read the EncProg 24 from Storage 12E, either as a unit or as EncBlocks 24E as necessary to execute the requested operation or operations to be performed by the Program 18, and will decrypt the EncProg 24 or EncBlocks 24E to recover the original program code, that is, Program 18 or the corresponding Code Blocks 18A. Load/Decrypt 28 will write the decoded Program 18 code into Memory 12C as directed by Memory Manager 30A and at locations determined by Memory Manager 30A, where the Program 18 code will be executed by Processor 12A to perform the requested operation.

It will be noted, and well understood by those of ordinary skill in the relevant arts, that the decrypted program code of the Program 18, whether as a single entity or on a Code Block 18A by Code Block 18A basis, will be written into Memory 12C at locations determined by Memory Manager 30A, and that these locations will differ upon each invocation of the Program 18, depending upon current Memory 12C usage at each instance.

It will also be noted, and understood by those of ordinary skill in the relevant arts, that the duration of the Program 18 or any Code Block 18A of the Program 18 in Memory 12C, that is, of any part of the program code in non-encrypted form, will be only during the period in which the program code is being executed and for a relatively very short variable time thereafter as Memory Manager 30A will, in the normal operation of Memory Manager 30A, delete or overwrite the Program 18 code after the code is executed and thus is no longer required. The Program 18 code will therefore effectively exist in the PU 12 in non-encrypted form only during the period during which the Program 18 code is being executed, thereafter being effectively erased or otherwise deleted from. Memory 12C.

Further in this regard, it has been described above that in the presently preferred embodiment of the invention, Program 18 is written in the form of a plurality of Code Blocks 18A and is then encrypted, Code Block 18A by Code Block 18A, so that EncProg 24 is likewise comprised of a plurality of EncBlocks 24E wherein each EncBlock 24E is the encrypted version of a corresponding Code Block 18A. As such, each EncBlock 24E will be separately and individually decrypted to recover the corresponding original Code Block 18A version of the program code, so that, given that Memory Manager 30A will effectively delete each Code Block 18A after it has been executed, only a relatively small portion of Program 18 will exist in the PU 12 in non-encrypted form at any time.

Lastly in this regard, it should be noted that Memory Manager 30A may be designed to specifically delete from Memory 12C all program code as soon as the execution of the program code is completed, rather than as part of the normal re-assignment of Memory 12C space to other purposes during the normal memory management operations. This modification to Memory Manager 30A will thereby reduce the period in which any part of a Program 18 code exists in non-encrypted form to the minimum possible period. Also in this regard, it has been described that the normal operation of Memory Manager 30A will cause the decrypted Program 18 code to reside in a different location or set of locations in Memory 12C at each invocation of a Program 18 function or operation, thereby hindering the reading of the decrypted program code by convention "debugging" processes and tools and enhancing the security provided to the program code by the present invention.

Finally, it must be noted that, as well understood by those of ordinary skill in the relevant arts, the execution of a Process 16 in or by a PU 12 is conducted in an operating environment that is generally referred to as a "context". The context in which a Process 16 is executed includes, for example, the current operating state of the system, the current execution state of the Process 16 and the program the Process 16 is executing, and so on. In general, and typically, each Process 16 is executed in a corresponding context and the execution of a different Process 16 involves or requires a change of the system operating context to another context corresponding to the new Process 16. Such changes in context, which are often referred to as "context switches" or "context swaps", may occur, for example, when a Process 16 must call another Process 16 for an operation or has been completed or when the processor "time slice" allocated to a Process 16 has ended and the processor is to be allocated to the execution of a different Process 16.

During a context switch, the execution of the currently executing Process 16 is suspended and the storage space in Memory 12C is reassigned by the Memory Manager 30A to accommodate the programs and data of the new Process 16, thereby requiring that the context of the current Process 16 be saved to allow the execution of the Process 16 to be resumed at the point it was suspended when the Process 16 is "switched" or "swapped" in and again becomes the Process 16 currently being executed. The saving and return of context state is typically performed by a Context Switch Mechanism 30C that operates co-operatively with the Memory Manager 30A and that maintains and manages a Context Memory 30D which may reside on Storage 12E or in Memory 12C and is used to store the essential context information, identified in FIG. 2 as Context State 30E, of a context being switched or swapped out of Memory 12C. As well understood by those of ordinary skill in the relevant arts, a Context Memory 30D may be implemented in a number of structures and formats and the context information may include, for example, the state of execution of a program being executed by the Process 16, data being generated as a result of the Process 16 operations, and so on.

In the presently preferred embodiment of the present invention, and in those embodiments requiring provision for context switching, the Context Switch Mechanism 30C is modified to include at least the Header 18H of a Program 18 among the Context State 30E elements stored in Context Memory 30D when the Process 16 in which the Program 18 is being executed is context switched. Context Switch Mechanism 30C then returns the Header 18H to Memory 12C when the Process 16 in which the Program 18 is being executed is returned or restored for execution, and the context of the Process 18 is correspondingly returned, so that Header 18H is available to Load/Decrypt 28 during continuation of the execution of the Program 18.

In summary, therefore, it has been described above that a program that is to reside in a processor unit to control operations of the processor unit and that is to be protected according to the method and apparatus of the present invention is created in the conventional manner and is then encrypted to be accessible only by a decryption process requiring a decryption key. In the presently preferred embodiment of the invention, the program is constructed as a set of code blocks wherein each code block performs a function or operation of the program, and is encrypted on a code block by code block basis so that the functions and operations of the program may be accessed by decrypting only the corresponding code block of the program.

The encrypted version of the program is thereafter installed in the processor unit that it is to control, resides therein only in encrypted form except during the periods in which the program code is being actively executed, is accessible for execution only through operation of a specific loader/decryption mechanism, and may be accessed only when the appropriate decryption key is provided to the loader/decryption mechanism.

Further in this regard, the loader/decryption mechanism operates in conjunction with a memory management unit to detect that the program is encrypted, to decrypt the program to recover the original, non-encrypted version of the program, and to load the program into the processor unit memory, where the program code is executed to perform the invoked operation. The memory management functions of the processor unit will operate to overwrite or otherwise delete the decrypted portions of the program code as execution of the program code is completed, so that the program code exists in the processor unit in its original, un-encrypted form only while being executed.

Further in this respect, in the presently preferred embodiment of the invention the encrypted program is constructed as a set of encrypted code blocks, each performing a function or operation of the program, and the encrypted code blocks are decrypted, loaded into memory and executed as required so that only a portion of the program will exist in the processor unit in its original, unencrypted form at any time. In addition, the memory manager may be designed to specifically delete decrypted program code as the execution of the code is completed, thereby ensuring that the program code exists in the processing unit in its decrypted form for only the minimum necessary period.

It will be understood and appreciated by those of ordinary skill in the relevant arts that the present invention may be embodied in a number of alternative implementations. For example, the encrypted program and loader/decryption mechanism of the present invention is not limited to only use in specific function processor units, such as printers, but may be similarly implemented in general purpose processor units. Also, the program may be invoked by a specific function processor unit, as well as by a general purpose processor unit, and may be invoked from within the processor unit in which it resides, for example, by another program or by a user. In further alternate implementations, the encrypted program need not be directly resident in the processor unit it is to control, but may be installed in another general or specific purpose processor unit and downloaded to the processor unit only when it is to be executed. In yet another alternative implementation, the encrypted program may be stored and executed in a processor unit separate from the processor unit to be controlled by the program, with the processor unit in which it is resident and executed controlling the processor unit that is to be controlled by the program, in the manner, for example, of a printer driver residing and executing in a personal computer and controlling a printer. Also, the decryption key may reside in and be provided directly from a processor unit calling a function or operation of the program, or may reside in and be provided from an administrative processor unit in response to a request from the processing unit invoking the program.

It will therefore be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. In a computer system processing unit, the processing unit including a processor responsive to program code for performing operations, a memory for storing program code to be executed to control operations of the processor unit, a storage unit for storing programs, and a memory manager for managing use of the memory, a mechanism for securely storing and executing a program, comprising:

the storage unit for storing an encrypted version of the program, a loader/decryption mechanism responsive to a request for an operation to be performed by the program and to a decryption key for reading the encrypted version of the program from the storage unit, decrypting the encrypted version of the program according to the decryption key to recover an un-encrypted version of the program code, and responsive to direction of the memory manager, writing the un-encrypted version of the program code into the memory for execution by the processor, wherein the processor is responsive to execution of the program code for deleting the un-encrypted version of the program code from the memory when execution of the program code is completed, storing a clear text header in a context store when a process in which the program is being executed is suspended in a context switch, and returning the clear text header to the memory when the process is resumed.

2. The mechanism for securely storing and executing a program of claim 1, wherein:

the encrypted version of the program is constructed as a plurality of encrypted code blocks, each encrypted block containing the encrypted program code for performing a function of the program.

3. The mechanism for securely storing and executing a program of claim 2, wherein:

the encrypted code blocks are decrypted and loaded into the memory only as required for execution of the requested operation.

4. The mechanism for securely storing and executing a program of claim 1, wherein:

the decryption key is provided to the processor unit from an external source in conjunction with the request for an operation.

5. The mechanism for securely storing and executing a program of claim 1, wherein:

the memory manager operates to delete the un-encrypted version of the program code from the memory when execution of the -un-encrypted version of the program code is completed by operation of the memory in directing the loading of subsequent other program code into the memory.

6. The mechanism for securely storing and executing a program of claim 1, wherein:

the memory manager is responsive to execution of the program code for detecting completion of execution of the un-encrypted version of the program code and deleting the executed un-encrypted version of the program code from the memory.

7. The mechanism for securely storing and executing a program of claim 1, wherein:

the loader/decryption mechanism is responsive to the request for an operation to be performed by the encrypted program for reading the encrypted version of the program from the storage unit, detecting that the encrypted version of the program is an encrypted program, and decrypting the encrypted version of the program to recover the un-encrypted version of the program code.

8. The mechanism for securely storing and executing a program of claim 7, wherein:

the encrypted version of the program includes a clear text header identifying the encrypted version of the program as an encrypted program.

9. In a computer system processing unit, the processing unit including a processor responsive to program code for performing operations, a memory for storing program code to be executed to control operations of the processor unit, a storage unit for storing programs, and a memory manager for managing use of the memory, a method for securely storing and executing a programs, comprising the steps of:

storing an encrypted version of the program in the storage unit, in response to a request for an operation to be performed by the program and to a decryption key, reading the encrypted version of the program from the storage unit, decrypting the encrypted version of the program according to the decryption key to recover an un-encrypted version of the program code, and writing the un-encrypted version of the program code into the memory for execution by the processor, executing the un-encrypted version of the program code to perform the requested operation, and deleting the un-encrypted version of the program code form the memory when execution of the program code is completed, storing a clear text header in a context store when a process in which the program is being executed is suspended in a context switch, and returning the clear text header to the memory when the process is resumed.

10. The method for securely storing and executing a program of claim 9, wherein:

the encrypted version of the program is constructed as a plurality of encrypted code blocks, each encrypted code block containing the encrypted program code for performing a function of the program.

11. The method for securely storing and executing a program of claim 10, wherein:

the encrypted code blocks are decrypted and loaded into the memory only as required for execution of the requested operation.

12. The method for securely storing and executing a program of claim 9, further comprising the step of:

providing the decryption key to the processor unit for an external source in conjunction with the request for an operation.

13. The method for securely storing and executing a program of claim 9, wherein:

the un-encrypted version of the program code is deleted from the memory when execution of the un-encrypted version of the program code is completed by operation of the memory manager in directing the loading of subsequent other program code into the memory.

14. The method for securely storing and executing a program of claim 9, wherein:

the un-encrypted version of the program code is deleted from the memory by detecting completion of execution of the un-encrypted version of the program code, and deleting the executed un-encrypted version of the program code from the memory.

15. The method for securely storing and executing a program of claim 9, further comprising the steps of:

reading the encrypted version of the program from the storage unit, detecting that the encrypted version of the program is an encrypted program, and decrypting the encrypted version of the program to recover the un-encrypted version of the program code.

16. The method for securely storing and executing a program of claim 13, wherein:

the encrypted version of the program includes a clear text header identifying the encrypted version of the program as an encrypted program.

\* \* \* \* \*